United States Patent
Jurthe

(10) Patent No.: US 10,285,134 B2
(45) Date of Patent: May 7, 2019

(54) APPARATUS, METHOD AND COMPUTER PROGRAM FOR A MOBILE DEVICE

(71) Applicant: VOLKSWAGEN AG, Wolfsburg (DE)

(72) Inventor: Sascha Jurthe, Hattingen (DE)

(73) Assignee: VOLKSWAGEN AG (DE)

( * ) Notice: Subject to any disclaimer, the term of this patent is extended or adjusted under 35 U.S.C. 154(b) by 0 days.

(21) Appl. No.: 15/894,130

(22) Filed: Feb. 12, 2018

(65) Prior Publication Data

US 2018/0255516 A1 Sep. 6, 2018

(30) Foreign Application Priority Data

Mar. 1, 2017 (DE) .................. 10 2017 203 358

(51) Int. Cl.
*H04W 52/02* (2009.01)
*H04W 24/02* (2009.01)
(Continued)

(52) U.S. Cl.
CPC ....... *H04W 52/0261* (2013.01); *H04W 16/10* (2013.01); *H04W 24/02* (2013.01); *H04W 48/02* (2013.01); *H04W 52/02* (2013.01); *H04W 52/028* (2013.01); *H04W 52/0277* (2013.01); *H04W 84/042* (2013.01); *H04W 84/12* (2013.01); *H04W 88/06* (2013.01); *Y02D 70/00* (2018.01); *Y02D 70/10* (2018.01);
(Continued)

(58) Field of Classification Search
CPC .......... H04W 52/0277; H04W 52/028; H04W 52/0261; H04W 52/0209; H04W 52/02; H04W 48/08; H04W 48/18; H04W 36/14; H04W 36/22; Y02B 60/50

USPC ................ 455/343.6, 552.1–553.1, 572–574
See application file for complete search history.

(56) References Cited

U.S. PATENT DOCUMENTS

| 7,813,772 | B2 * | 10/2010 | Camp, Jr. | .............. H04B 1/406 455/574 |
| 8,160,639 | B2 * | 4/2012 | Kitani | .................... H04B 1/406 370/312 |

(Continued)

FOREIGN PATENT DOCUMENTS

| DE | 202008006504 U1 | 2/2009 |
| DE | 102010030224 A1 | 12/2011 |

(Continued)

OTHER PUBLICATIONS

Search Report for European Patent Application No. 18153812.5; dated Oct. 31, 2018.

*Primary Examiner* — Lee Nguyen
(74) *Attorney, Agent, or Firm* — Barnes & Thornburg LLP

(57) ABSTRACT

An apparatus, a method and a computer program for a mobile device. The apparatus has a transceiver module for communication in a first mobile communication system and in a second mobile communication system and a control module to determine whether a time period until an estimated next time for replenishing an energy supply of the mobile device lies above a time threshold value. The control module uses the first mobile communication system for a data transmission if the time period lies above the time threshold value and uses the second mobile communication system for the data transmission if a connection to the second mobile communication system is available at or before the next time for replenishing the energy reserve of the mobile device.

10 Claims, 2 Drawing Sheets

(51) Int. Cl.
*H04W 16/10* (2009.01)
*H04W 48/02* (2009.01)
*H04W 52/12* (2009.01)
*H04W 84/04* (2009.01)
*H04W 84/12* (2009.01)
*H04W 88/06* (2009.01)

(52) U.S. Cl.
CPC ...... *Y02D 70/1224* (2018.01); *Y02D 70/1242* (2018.01); *Y02D 70/1262* (2018.01); *Y02D 70/14* (2018.01); *Y02D 70/142* (2018.01); *Y02D 70/146* (2018.01); *Y02D 70/20* (2018.01)

(56) References Cited

U.S. PATENT DOCUMENTS

| | | |
|---|---|---|
| 2006/0014516 A1 | 1/2006 | Cheng |
| 2006/0209176 A1 | 9/2006 | Nakamura et al. |
| 2007/0004387 A1 | 1/2007 | Gadamsetty et al. |
| 2010/0273486 A1 | 10/2010 | Kharia et al. |
| 2012/0106672 A1 | 5/2012 | Shelton et al. |
| 2016/0337960 A1 | 11/2016 | Nagasaka et al. |
| 2016/0370843 A1 | 12/2016 | Gatson et al. |

FOREIGN PATENT DOCUMENTS

| | | |
|---|---|---|
| DE | 102015204373 A1 | 9/2015 |
| EP | 1699028 A1 | 9/2006 |
| JP | 2006279926 A | 10/2006 |
| JP | 2010166355 A | 7/2010 |
| WO | 2014112599 A1 | 1/2017 |

* cited by examiner

APPARATUS, METHOD AND COMPUTER PROGRAM FOR A MOBILE DEVICE

PRIORITY CLAIM

This patent application claims priority to German Patent Application No. 10 2017 203 358.4, filed 1 Mar. 2017, the disclosure of which is incorporated herein by reference in its entirety.

SUMMARY

Example embodiments relate to an apparatus, a method and a computer program for a mobile device, more precisely, but not exclusively, an apparatus for controlling a use of a first mobile communication system or a second mobile communication system for a data transmission.

BRIEF DESCRIPTION OF THE DRAWINGS

Disclosed embodiments are described in detail below with reference to the drawings, but without generally being restricted on the whole to the example embodiments. In the drawings.

DETAILED DESCRIPTION

Figure 1:
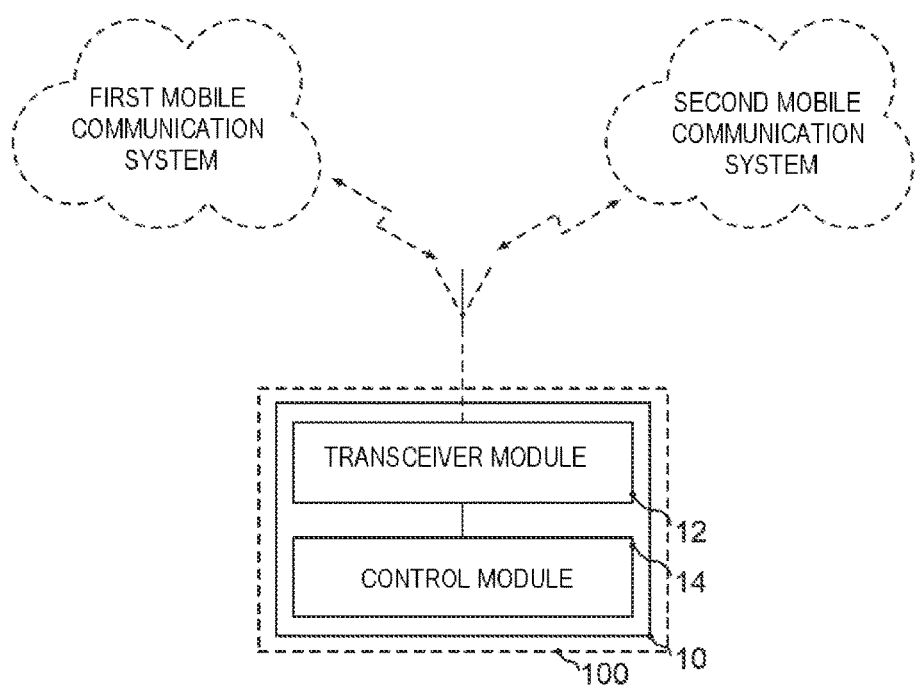
FIG. 1 shows a block diagram of an apparatus for a mobile device.

The transmission of large data volumes onto mobile devices or from mobile devices frequently presents users and developers with a dilemma. On the one hand, cellular mobile telecommunication systems, such as, for example, Long Term Evolution (LTE) or Universal Mobile Telecommunication System (UMTS), can be used to carry out the data transmission at many locations. On the other hand, these cellular mobile telecommunication systems are frequently designed so that many users share a limited number of communication resources, which can reduce a transmission capacity of such mobile telecommunication stations for individual users. Furthermore, high costs are often incurred in the transmission of large data volumes via mobile telecommunication systems of this type. Alternatively, local wireless networks, for example, (also referred to as wireless Local Access Networks, WLAN) can be used, but their availability may be locally limited.

US patent application 2010/0 273 486 A1 describes a mobile device which is designed to communicate in a first mobile communication system (for example, a base station) and in a second mobile communication system (for example, a wireless access point) and to determine a remaining battery time for the respective communication. On the basis of this prediction, the user of the device can determine which of the mobile communication systems should be used for the communication. However, the application does not disclose how to determine an estimated next time for replenishing the energy reserve and carry out data transmissions on the basis of the estimated next charging time.

German patent application DE 10 2010 030 224 A1 discloses a method and an apparatus for data transmission between a communication unit and a vehicle, for example, via a mobile telecommunication connection or a wireless access point. In this data exchange, for example, an energy status of a communication interface, for example, a mobile device, can be taken into account to plan a data exchange. However, the application does not indicate how to carry out data transmissions on the basis of an estimated next charging time of the communication interface or the vehicle.

German patent application DE 10 2015 204 373 A1 discloses a method for refueling motor vehicles with a liquid fuel. In addition to the liquid fuel, a wireless communication is set up between the vehicle and the refueling device.

US patent application 2012/0 106 672 A1 discloses a method and a charging adapter for providing energy services via a network with network connection points (such as charging stations for electric vehicles). The registration of an electric vehicle on the charging station is carried out via a wireless network via which it is ensured that an account of the owner of the electric vehicle can be charged in return for the discharged energy.

The need exists for an improved concept for a data transmission by mobile devices. Example embodiments provide an apparatus, a method and a computer program for a mobile device. The mobile device may, for example, be a vehicle, such as an automobile or a motorcycle, or, for example, a (programmable) mobile telephone (also referred to as a Smartphone) or a tablet computer. The apparatus may be designed to determine, on the basis of an energy reserve of the mobile device, whether the energy reserve is estimated to be replenished soon, for example, at a service station or at home on a charging cable. If so, the apparatus may be designed to delay a data transmission and then carry it out before or during the replenishment of the energy reserve via a local wireless network. If the next time for replenishing the energy reserve is still too far ahead in the future, the apparatus may be designed to carry out the data transmission via a cellular mobile telecommunication system, e.g., LTE or UMTS.

Example embodiments provide an apparatus for a mobile device. The apparatus comprises a transceiver module, designed for communication in a first mobile communication system and in a second mobile communication system. The apparatus furthermore comprises a control module designed to determine whether a time period until an estimated next time for replenishing an energy reserve of the mobile device lies above a time threshold value. The control module is furthermore designed to use the first mobile communication system for a data transmission if the time period lies above the time threshold value, and to use the second mobile communication system for the data transmission if a connection to the second mobile communication system is available at or before the next time for replenishing the energy reserve of the mobile device.

The apparatus can assess whether the mobile device will be located in the coverage area of the second mobile communication system within an acceptable timeframe. Data transmissions can thus be carried out in real time via the first mobile communication system if this is not to be expected, and otherwise an availability of the second mobile communication system can be awaited to reduce costs, for example, while replenishing the energy reserve.

The control module may furthermore be designed, for example, to determine whether a probability that the mobile device will be located in a coverage area of the second mobile communication system at the estimated next time for replenishing the energy reserve is less than a probability threshold value. The control module may furthermore be designed to use the first mobile communication system for the data transmission if the probability is less than the probability threshold value. A probability that the mobile device will be located in the coverage area of the second mobile communication system when replenishing the energy reserve can furthermore be incorporated through a probability function.

The control module may be designed, for example, to determine a position of the mobile device. The control module may be designed to determine, on the basis of the position of the mobile device, whether the time period until an estimated next time for replenishing the energy reserve of the mobile device lies above the time threshold value. The control module may be designed, for example, to establish whether the mobile device is located in the vicinity of or on the way to a preferred location for replenishing the mobile device.

The control module may be designed, for example, to determine, on the basis of a further time period since a last time for replenishing the energy reserve of the mobile device, whether the time period until an estimated next time for replenishing the energy reserve of the mobile device lies above the time threshold value. The control module may thus be designed, for example, to estimate, on the basis of a replenishment history, when the estimated next time for replenishing the energy reserve will (prospectively) be.

The control module may be designed, for example, to determine, on the basis of an energy consumption of the mobile device, whether the time period until an estimated next time for replenishing the energy reserve of the mobile device lies above the time threshold value. The control module may be designed, for example, to calculate, on the basis of the energy consumption and on the basis of the energy reserve, when the estimated next time for replenishing the energy reserve will (prospectively) be.

The replenishment of the energy reserve of the mobile device may correspond, for example, to a replenishment of the energy reserve with electrical energy, with gasoline/diesel, with natural gas, with liquefied petroleum gas or with hydrogen.

The mobile device may correspond, for example, to a vehicle. In the case of a vehicle, operating system updates or map data, for example, can be implemented as data transmissions if the second mobile communication system is available, or, if the time period is too long, via the first mobile communication system, for example, during the journey or when the vehicle is parked.

The control module may furthermore be designed, for example, to determine whether a further time period until an estimated next vehicle service on the vehicle lies above the time threshold value. The control module may be designed to use the first mobile communication system for the data transmission if the time period and the further time period lie above the time threshold value. The data transmission can thus be delayed, for example, if the vehicle is due for a service.

Alternatively, the mobile device may correspond to a mobile telephone, a programmable mobile telephone, a programmable clock or a tablet computer. If the mobile telephone is being charged, it will often be located in a coverage area of a wireless home network (WLAN) of a user of the mobile telephone.

The first mobile communication system may correspond, for example, to a cellular mobile telecommunication system. The second mobile communication system may correspond to a wireless local network. Data transmission via the wireless local network may, for example, reduce a load on the first mobile communication system, enable faster data transmissions and reduce costs for the data transmission.

The first mobile communication system may correspond, for example, to a mobile communication system with a first higher range, and the second mobile communication system may correspond to a mobile communication system with a second lower range.

The data transmission may correspond, for example, to a transmission of data with a data volume of more than 50 megabytes. Data transmissions with a large data volume may, for example, be carried out more reliably and faster via the second mobile communication system.

The data transmission may correspond, for example, to a transmission of map data, of program updates of computer programs of the mobile device, of updates of an operating system of the mobile device, of swarm data and/or of media data. Data transmissions of this type frequently have a large data volume.

Example embodiments furthermore provide a method for a mobile device. The method comprises determining whether a time period until an estimated next time for replenishing an energy reserve of the mobile device lies below a time threshold value. The method furthermore comprises using a first mobile communication system for the data transmission if the time period lies above the time threshold value. The method furthermore comprises using a second mobile communication system for the data transmission if a connection to the second mobile communication system is available at or before the next time for replenishing the energy reserve of the mobile device.

Example embodiments furthermore provide a program with a program code to carry out the method when the program code is executed on a computer, a processor, a control module or a programmable hardware component.

Different example embodiments will now be described in more detail with reference to the attached drawings, in which a number of example embodiments are shown. The thickness dimensions of lines, layers and/or regions may be shown in exaggerated form for the sake of clarity.

In the following description of the attached figures which merely show some example embodiments, the same reference numbers may denote the same or comparable components. Summarizing reference numbers may furthermore be used for components and objects which occur multiple times in at least one example embodiment or in a drawing but are described jointly in terms of one or more features. Components or objects which are described with the same or summarizing reference numbers may be designed identically in terms of individual, a plurality or all features, for example, their dimensioning, but in some instances may also be designed differently, unless otherwise explicitly or implicitly indicated in the description.

Although example embodiments may be modified and adapted in different ways, example embodiments in the figures are presented as examples and are described in detail herein. However, it should be made clear that there is no intention to limit example embodiments to the respectively disclosed forms, but rather that example embodiments are intended to cover all functional and/or structural modifications, equivalents and alternatives that fall within the scope of the disclosure. The same reference numbers denote the same or similar elements in the entire description of the figures.

It should be noted that an element that is designated as "connected" or "coupled" to another element may be directly connected or coupled to the other element or that intermediate elements may be present. On the other hand, if an element is designated as "directly connected" or "directly coupled" to another element, no intermediate elements are present. Other terms that are used to describe the relationship between elements should be interpreted in a similar manner (e.g., "between" as opposed to "directly between", "adjacent" as opposed to "directly adjacent", etc.).

The terminology used herein serves only to describe specific example embodiments and is not intended to limit the example embodiments. As used herein, the singular forms "a", "an" and "the" are also intended to include the plural forms, unless the context clearly indicates otherwise. It should furthermore be made clear that expressions such as "contains", "containing", "has" and/or "having", "comprises" and/or "comprising", as used herein, indicate the existence of specified features, integers, operations, workflows, elements and/or components, but do not exclude the presence or the addition of one or more features, integers, operations, workflows, elements, components and/or groups thereof.

Unless otherwise defined, all terms used herein (including technical and scientific terms) have the same meaning that an average person skilled in the art in the field to which the example embodiments belong attributes to them. It should furthermore be made clear that expressions, e.g., those that are defined in generally used dictionaries are to be interpreted as if they had the meaning that is consistent with their meaning in the context of the relevant technology, and are not to be interpreted in an idealized or excessively formal sense, unless this is expressly defined herein.

FIG. 1 shows a block diagram of an apparatus 10 for a mobile device 100. The apparatus comprises a transceiver module 12, designed for communication in a first mobile communication system and in a second mobile communication system. The apparatus 10 furthermore comprises a control module 14, designed to determine whether a time period until an estimated next time for replenishing an energy reserve of the mobile device 100 lies above a time threshold value. The control module 14 is furthermore designed to use the first mobile communication system for a data transmission (via the first transceiver module 12) if the time period lies above the time threshold value, and to use the second mobile communication system for the data transmission if a connection to the second mobile communication system is available at or before the next time for replenishing the energy reserve of the mobile device 100.

Figure 1A:
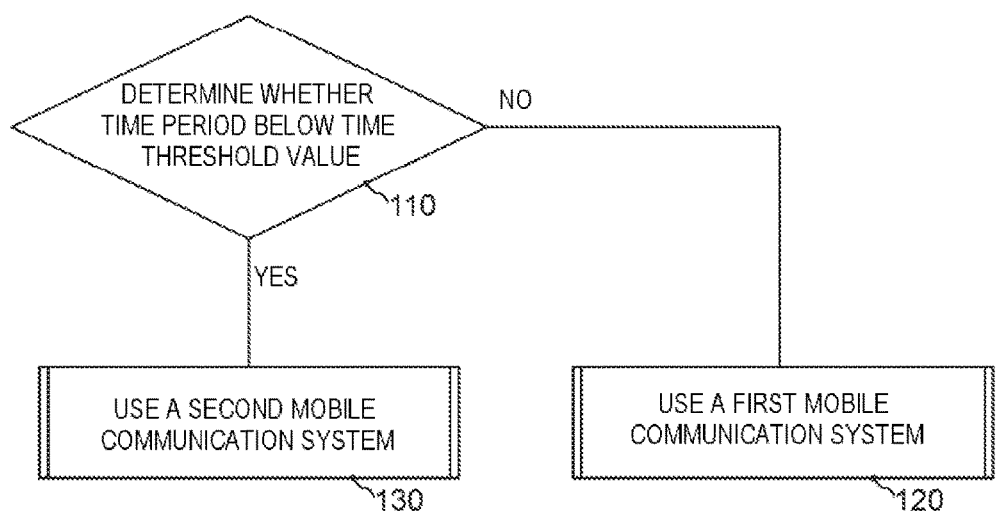
FIG. 1a shows a flow diagram of a corresponding method for the mobile device.

FIG. 1a shows a flow diagram of a corresponding method for the mobile device 110. The method comprises determining 110 whether the time period until the estimated next time for replenishing the energy reserve of the mobile device 100 lies below the time threshold value. The method furthermore comprises using 120 the first mobile communication system for the data transmission if the time period lies above the time threshold value. The method furthermore comprises using 130 the second mobile communication system for the data transmission if the connection to the second mobile communication system is available at or before the next time for replenishing the energy reserve of the mobile device 100. The following description may relate to both the apparatus 10 and to the corresponding method for the mobile device 100.

The mobile device 100 may correspond, for example, to a vehicle (or an information system of a vehicle) or a mobile telephone, a programmable mobile telephone, a programmable clock or a tablet computer.

The first mobile communication system may correspond, for example, to a mobile communication system with a first higher range. The first mobile communication system may, for example, have a coverage area (of a cell of the first mobile communication system) with a radius of more than 100 m (or more than 200 m, more than 500 m, more than 1 km). The second mobile communication system may correspond to a mobile communication system with a second lower range. The second mobile communication system may, for example, have a coverage area (of an access point of the second mobile communication system) with a radius of less than 100 m (or less than 50 m, less than 20 m). A coverage area may correspond, for example, to an area around a base station of a mobile communication system in which a signal strength of the base station enables at least 10% of a maximum data transmission speed of the base station in the case of a data transmission to the mobile device 100.

The first mobile communication system may correspond, for example, to a cellular mobile telecommunication system. The first mobile communication system may correspond, for example, to a cellular mobile communication system of the group of Global System for Mobile telecommunications (GSM), General Packet Radio Service (GPRS), Enhanced Data rates for GSM Evolution (EDGE), Universal Mobile Telecommunication System (UMTS), Long Term Evolution, a 5th generation (5G) mobile telecommunication system, and a mobile telecommunication system according to future standards. The transceiver module 12 may be designed to communicate in at least one cellular mobile communication system of the group of Global System for Mobile telecommunications (GSM), General Packet Radio Service (GPRS), Enhanced Data rates for GSM Evolution (EDGE), Universal Mobile Telecommunication System (UMTS), Long Term Evolution, a 5th generation (5G) mobile telecommunication system, and a mobile telecommunication system according to future standards.

The second mobile communication system may correspond to a wireless local network (also referred to as a Wireless Local Area Network, WLAN), a personal network (also referred to as a Personal Area Network, PAN, smaller than a WLAN), a Metropolitan Area Network, MAN, larger than a WLAN, an Internet of Things, IoT, network or a microwave-based mobile communication system, such as a WiMAX (Worldwide Interoperability for Microwave Access) system.

The communication with the first mobile communication system and the second mobile communication system may comprise, for example, a reception of data (for example, of data packets) and a transmission of data. The data transmission is comprised in the communication. The data transmission may correspond, for example, to a data reception (also referred to as download) or a data transmission (also referred to as upload). The data transmission may correspond, for example, to a transmission of data with a volume of more than 50 megabytes (or more than 100 megabytes, more than 200 megabytes, more than 500 megabytes, more than 1 gigabyte). The data transmission may correspond, for example, to a transmission of map data, of program updates of computer programs of the mobile device 100, of updates of an operating system of the mobile device 100, of swarm data (for example, sensor data or data which are determined or calculated by the mobile device) and/or of media data. The time threshold value may be dependent, for example, on a data volume of the data transmission. The time threshold value may correspond, for example, to a first higher time threshold value in the case of a first larger data volume and to a second lower time threshold value in the case of a second smaller data volume.

The control module 14 may be designed, for example, to calculate the estimated next time for replenishing the energy reserve on the basis of a current energy reserve of the mobile device 100. Alternatively or additionally, the control module 14 may be designed to calculate the (prospective) time period until the estimated next time for replenishing the energy reserve, for example, as a time period, as a selection of a group of possible time periods (for example, less than one hour, less than one day, less than two days, less than 5 days, etc.) or in a binary decision (above or below the time threshold value). The time threshold value may, for example, be an absolute date and/or an absolute time. Alternatively, the time threshold value may define a relative time duration, for example, from the time when the control module 14 receives a request for the data transmission. The time period until the estimated next time for replenishing the energy reserve may lie above the time threshold value if the time period is longer than the relative time duration or if the time period ends at a time which falls later than the absolute date/the absolute time.

The control module 14 may be designed, for example, to determine a position of the mobile device 100. The apparatus may comprise, for example, a positioning module, for example, a satellite navigation positioning module. The control module 40 may be designed to determine the position of the mobile device via the positioning module. Alternatively or additionally, the control module 14 may be designed to determine the position of the mobile device via the transceiver module 12, for example, on the basis of a distance to two or more base stations of the first mobile communication system and/or of the second mobile communication system. The control module 14 may be designed to determine, on the basis of the position of the mobile device 100, whether the time period until the estimated next time for replenishing the energy reserve of the mobile device 100 lies above the time threshold value. The control module 14 may be designed, for example, to calculate the estimated next time for replenishing the energy reserve on the basis of the position of the mobile device. The control module 14 may be designed, for example, to determine the estimated next time for replenishing the energy reserve on the basis of whether the mobile device is located in the vicinity of a location used for the replenishment of the energy reserve or on the way to a location used for the replenishment of the energy reserve.

The control module 14 may be designed, for example, to determine, on the basis of a further time period since a last time for replenishing the energy reserve of the mobile device, whether the time period until an estimated next time for replenishing the energy reserve of the mobile device 100 lies above the time threshold value. The control module 14 may be designed, for example, to calculate the estimated next time for replenishing the energy reserve on the basis of the further time period since the last time for replenishment. The control module 14 may be designed, for example, to log the replenishment of the energy reserve. The control module 14 may be designed, for example, to log a time, a frequency and/or a time duration between consecutive replenishment operations. The control module 14 may be designed, for example, to calculate an estimated time duration between two consecutive replenishment operations (for example, on the basis of the log on the basis of a statistic relating to the replenishment operations). The control module 14 may be designed to determine the estimated next time for replenishing the energy reserve on the basis of the estimated time duration. The control module 14 may be designed to determine, on the basis of the estimated time duration, whether the time period until an estimated next time for replenishing the energy reserve of the mobile device 100 lies above the time threshold value. The control module 14 may be designed, for example, to calculate the estimated next time for replenishing the energy reserve on the basis of an average residual energy reserve during replenishment. The control module 14 may be designed, for example, to determine, on the basis of the average residual energy reserve during replenishment, whether the time period until an estimated next time for replenishing the energy reserve of the mobile device 100 lies above the time threshold value.

The control module 14 may be designed, for example, to determine, on the basis of an energy consumption of the mobile device 100, whether the time period until an estimated next time for replenishing the energy reserve of the mobile device 100 lies above the time threshold value. The control module 14 may be designed, for example, to determine the estimated next time for replenishing the energy reserve on the basis of the energy consumption of the mobile device 100. The energy consumption may correspond, for example, to an energy consumption per time unit (or an energy consumption per distance). The control module 14 may be designed, for example, to determine (to estimate) an estimated energy consumption until the time threshold value and, on the basis of the estimated energy consumption, to determine whether the time period until an estimated next time for replenishing the energy reserve of the mobile device 100 lies above the time threshold value.

The control module 14 may be designed, for example, to start the data transmission via the first mobile communication system if the time period lies above the time threshold value (and, for example, with an availability of a connection to the second mobile communication system, to continue it via the second mobile communication system). The control module 14 may be designed, for example, to transmit data of the data transmission via the first mobile communication system if the time period lies above the time threshold value. The control module 14 may be designed, for example, to check periodically during the data transmission whether the second mobile communication system is available for the data transmission, and to continue the data transmission via the second mobile communication system if the second mobile communication system is available for the data transmission.

The control module 14 may be designed, for example, to delay the data transmission if the time period lies below the time threshold value, for example, until the next replenishment of the energy reserve, until a next availability of a connection to the second mobile communication system or until a time which is defined by the time threshold value.

The connection to the second mobile communication system may be available, for example, if the mobile device 100 is located in a coverage area of the second mobile communication system. The control module may be designed, for example, to use the second mobile communication system for the data transmission if a connection to the second mobile communication system is available between an occurrence of the data transmission and the time which is defined by the time threshold value. The control module 14 may be designed, for example, to check periodically or in an event-based manner whether the connection to the second mobile communication system is available/the mobile device 100 is located in a coverage area of the second mobile communication system. The control module 14 may be designed, for example, to carry out the data transmission if the connection to the second mobile communication system is available/the mobile device is located in a coverage area of the second mobile communication system. If the mobile device 100 is not located in a coverage area of the second mobile communication system at a time which is defined by the time threshold value (no connection to the second mobile communication system is available until the time defined by the time threshold value), the control module 14 may be designed to use the first mobile communication system for the data transmission.

For example, the control module 14 may furthermore be designed to determine whether a probability that the mobile device 100 will be located in a coverage area of the second mobile communication system at the estimated next time for replenishing the energy reserve is less than a probability threshold value. The control module 14 may be designed, for example, to calculate the probability that the mobile device 100 will be located in a coverage area of the second mobile communication system at the estimated next time for replenishing the energy reserve. The control module 14 may be designed, for example, during the (each) replenishment of the energy reserve, to check and/or to log whether the mobile device 100 is located in a coverage area of the second mobile communication system. The control module 14 may be designed, for example, to calculate a sliding probability of the mobile device 100 being located in a coverage area of the second mobile communication system during the next replenishment operation (for example, on the basis of all preceding replenishment operations, on the basis of the replenishment operations within a time period or on the basis of a predefined quantity of preceding replenishment operations). For example, the control module 14 may furthermore be designed to determine, on the basis of the position of the mobile device, whether the probability that the mobile device 100 will be located in a coverage area of the second mobile communication system at the estimated next time for replenishing the energy reserve is less than the probability threshold value. The control module furthermore is designed, for example, to use the first mobile communication system for the data transmission if the probability is less than the probability threshold value. The control module 14 may be designed, for example, to decide, on the basis of the probability and on the basis of the time period, whether the data transmission is carried out or started via the first mobile communication system or via the second mobile communication system. The control module 14 may be designed, for example, to use the first mobile communication system for the data transmission if the time period lies above the time threshold value and/or the probability lies below the probability threshold value. The probability threshold value may, for example, correspond to a proportional probability, such as 70% or 0.7.

In some example embodiments, the mobile device may correspond, for example, to a vehicle, for example, an automobile, a truck, a motorcycle, a ship, a train or an autonomously driving vehicle. The replenishment of the energy reserve of the mobile device 100 may correspond, for example, to a replenishment of the energy reserve with electrical energy, with a liquid fuel, with gasoline, with diesel, with natural gas, with liquefied petroleum gas or with hydrogen.

The control module 14 may furthermore be designed, for example, to determine whether a further time period until to an estimated next vehicle service interval on the vehicle lies above the time threshold value. The control module 14 may be designed, for example, to calculate the further time period on the basis of a fault condition, on the basis of a maintenance condition or on the basis of a service interval of the mobile device 100. The control module 14 may be designed, for example, to use the first mobile communication system for the data transmission if the time period and the further time period lie above the time threshold value.

Alternatively, the mobile device 100 may correspond to a mobile telephone, a programmable mobile telephone (such as a Smartphone), a programmable clock or a tablet computer. The replenishment of the energy reserve of the mobile device 100 may correspond, for example, to a replenishment of the energy reserve with electrical energy. The replenishment of the energy reserve may correspond, for example, to a connection of the mobile device to a mains charger. The replenishment of the energy reserve may correspond, for example, to a wireless charging operation.

Example embodiments furthermore provide the mobile device 100 comprising the apparatus for the mobile device 100. The control module 14 is coupled to the transceiver module 12. In example embodiments, the transceiver module 12 may contain typical transmitter and receiver components. This may include, for example, one or more antennas, one or more filters, one or more mixers, one or more amplifiers, one or more diplexers, one or more duplexers, etc. In example embodiments, the control module 14 may correspond to any given controller or processor or a programmable hardware component. The transceiver module 12 may comprise, for example, two separate transceiver submodules, for example, a first transceiver submodule for communicating with the first mobile communication system, and a second transceiver submodule for communicating with the second mobile communication system. The control module 14 may, for example, also be implemented as software which is programmed for a corresponding hardware component. In this case, the control module 14 may be implemented as programmable hardware with correspondingly adapted software. Any given processors, such as digital signal processors (DSPs), can be used. Example embodiments are not restricted to a specific type of processor. Any given processors or a plurality of processors are conceivable for implementing the control module 14.

Example embodiments provide, for example, a system and method for prioritizing data connections depending on the fuel reserve.

The requirement for mobile data in the vehicle will also increase further in future. However, the drawback of mobile data connections via mobile telecommunication networks is that they are relatively expensive in comparison with other data services (e.g., the home Internet connection, which is normally billed at a flat (usage-independent) rate. Nevertheless, the use of mobile-telecommunication-supported data services in the automobile environment cannot always be avoided.

At least some example embodiments describe a system and method which delays the use of a mobile-telecommunication-supported data service depending on the fuel reserve, thereby increasing the probability of being able to use less expensive cheaper data connections.

At least some systems make use of other data services, normally WLAN, for avoiding expensive mobile telecommunication data connections. In frequent cases, it is not always known in advance when a low-cost WLAN connection will be available. At least some example embodiments are based on a use of WLAN. Alternatively, the use of an expensive data connection can be delayed in some systems—in the hope of an interim availability of a less expensive data connection—until the use of the expensive data connection is unavoidable. If the use of an expensive data connection is delayed, it is not often foreseeable whether and when a less expensive data connection will be available. If the case never arose, time would be wasted unnecessarily in some cases. Alternatively, the data transmission can be delayed until a time when the mobile telecommunication provider offers more favorable terms for the data use, e.g., at night. However, it is often not the case that mobile communication providers in each case actually offer more favorable tariffs at night. Furthermore, the lower costs could even be foregone if it is ensured that the availability of a cost-free data connection is highly probable in the foreseeable future.

In at least some example embodiments, a WLAN network usable by the vehicle may also be available in future at a large number of filling stations.

Figure 2:
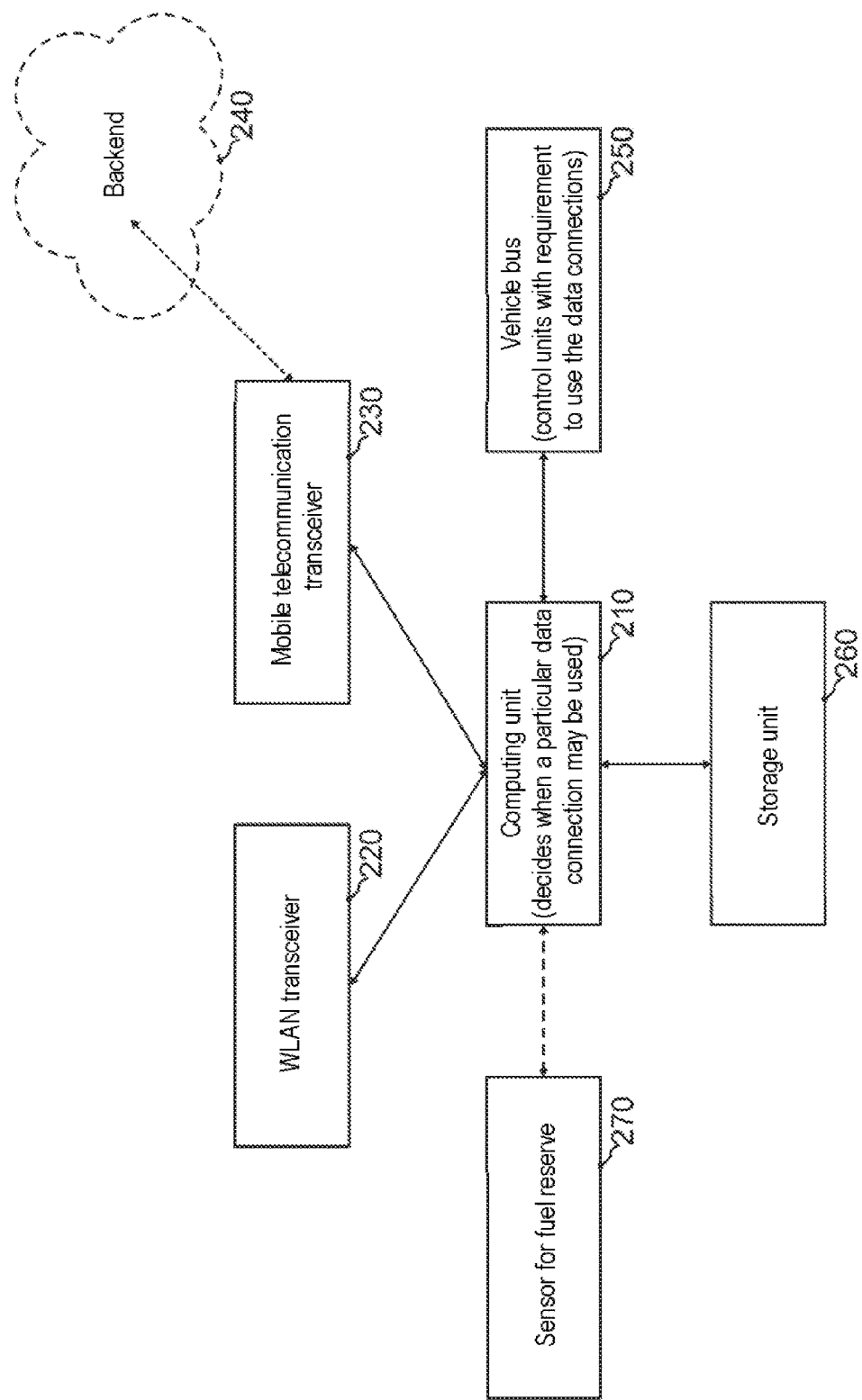
FIG. 2 shows a block diagram of an example of an apparatus for a motor vehicle.

FIG. 2 shows a block diagram of an apparatus with a data communication device 220 which comprises a WLAN transceiver module (WLAN transceiver 220) and a data communication device 230 which comprises a transceiver device (mobile telecommunication transceiver 230) for mobile telecommunication (2G, 3G, LTE, etc.). At least the mobile telecommunication transceiver 230 may be designed to communicate with a backend 240 (for example, a server or a data center of a vehicle manufacturer). The transceiver module 12 shown in FIG. 1 may, for example, comprise or implement the data communication devices (220; 230). The apparatus may furthermore comprises a sensor 270 for the fuel level and a computing and storage unit (210; 260, for example, the control module 14) which is connected to both systems. Further control units with a requirement to use the data connections can be connected via a vehicle bus 250 to the computing unit 210.

If (e.g., as soon as) the fuel level changes positively (=the vehicle is refueled), the computing unit may be designed to check whether a connection is simultaneously or will shortly be available. If so, a "probability index" (for the availability of the connection) can be increased by 10 in the storage unit, e.g., provided that it has not reached 100. If no WLAN connection is available during a refueling operation, the "probability index" can be reduced by 10 in the storage unit, provided that it is not reached 0. After at least 10 refueling operations, a statistic may be provided indicating the percentage of cases in which a WLAN connection was available in the past during a refueling operation. The time of the last 10 refueling operations, for example, can be stored in the storage unit to log the average time between two refueling operations.

The requirement for an upload or download of data (a data transmission from the vehicle to a server or a data transmission from the server to the vehicle), can, for example, either be instigated from the vehicle itself or can be triggered by a backend via the mobile telecommunication connection.

If a requirement then exists for the upload or download of a larger data quantity, the computing unit (for example, the control module 14 shown in FIG. 1) has the facility (may be designed) to anticipate with great accuracy how high the probability will be of being able to use a WLAN data connection again in a defined time, depending on the fuel level, the average time between two refueling operations (and therefore the estimated time until the next refueling operation) and the probability that a WLAN data connection will be available during the refueling operation. This knowledge may help in the planning of the upload and download activities and in some cases may help to avoid costly mobile telecommunication data connections.

"Fuel reserve" (or energy reserve) may relate, for example, not only to conventional (fossil) fuels such as gasoline, diesel, natural gas, liquefied petroleum gas (LPG) or hydrogen, but also to the state of charge of the traction battery. The calculation formula for the probability that a WLAN data connection will be available during the refueling is selected here by way of example and may be as complex as required or may be grossly simplified. The calculation formula for the time until the next refueling operation will be required is given here merely by way of example and may be refined, possibly using further sensor data. Other times, for example, at which the vehicle will arrive at a specific point where the availability of a WLAN is highly probable may also be taken into consideration. One example of this would be an imminent maintenance interval or a detected defect which, with high probability, will soon require a visit to a workshop.

The supply with fuel (of any type) may also remain a necessary operation—at relatively stable intervals—in future in the day-to-day life of the vehicle and may be used, for example, to carry out the data transmission (simultaneously). At the same time, many people are loyal to filling stations or brands, so that it can be assumed that if a WLAN network is available during the refueling operation x, the probability is high that a WLAN network will also be available during the refueling operation x+1.

At least some example embodiments enable a high predictability and therefore good planning capability for imminent upload or download activities in the vehicle environment. At least some example embodiments enable less expensive data connection through planning for WLAN availability instead of switching to less expensive mobile telecommunication times.

More details of the system, the apparatus and method are specified in connection with the concept or examples which have previously been described (e.g., FIGS. 1 and 1a). The system, the apparatus and/or the method may comprise one or more additional optional features which correspond to one or more embodiments of the proposed concept or the described examples as described previously or afterwards.

A further example embodiment is a computer program to carry out at least one of the methods described above if the computer program runs on a computer, a processor or a programmable hardware components. A further example embodiment is also a digital storage medium which is machine-readable or computer-readable, and which has electronically readable control signals which can interact with a programmable hardware component in such a way that one of the methods described above is carried out.

The features disclosed in the above description, the following claims and the attached figures can be relevant and can be implemented in their different configurations both individually and in any given combination for the implementation of an example embodiment.

Although some embodiments are described in connection with a device, it is obvious that these embodiments also represent a description of the corresponding method, so that a block or a component of a device should also be understood as a corresponding method operation or as a feature of a method operation. Similarly, embodiments that have been described in connection with or as a method operation also represent a description of a corresponding block or detail or feature of a corresponding device.

Depending on specific implementation requirements, example embodiments can be implemented in hardware or in software. The implementation can be carried out using a digital storage medium, for example, a floppy disk, a DVD, a Blu-ray disc, a CD, a ROM, a PROM, an EPROM, an EEPROM or a FLASH memory, a hard disk or a different magnetic or optical storage device on which electronically readable control signals are stored which can interact or interact with a programmable hardware component in such a way that the respective method is carried out.

A programmable hardware component may be formed by a processor, a computer processor (CPU=Central Processing Unit), a graphics processor (GPU=Graphics Processing Unit), a computer system, an application-specific integrated circuit (ASIC), an integrated circuit (IC), a system on chip (SoC), a programmable logic element or a field programmable gate array (FPGA) with a microprocessor.

The digital storage medium can therefore be machine-readable or computer-readable. Some example embodiments therefore comprise a data medium which has electronically readable control signals which are capable of interworking with a programmable computer system or a programmable hardware component in such a way that one of the methods described herein is carried out. At least one example embodiment is therefore a data medium (or digital storage medium or a computer-readable medium) on which the program to carry out one of the methods described herein is recorded.

Generally speaking, example embodiments can be implemented as a program, firmware, computer program or computer program product with a program code or as data, wherein the program code or the data is/are effective in carrying out one of the methods when the program runs on a processor or on a programmable hardware component. The program code or the data may, for example, also be stored on a machine-readable medium or data medium. The program code or the data may be provided, inter alia, as source code, machine code or byte code, or as a different intermediate code.

A further example embodiment is moreover a data stream, a signal sequence or a succession of signals which represent(s) the program to carry out one of the methods described herein. The data stream, the signal sequence or the succession of signals may, for example, be configured in such a way as to be transferred via a data communication connection, for example, via the Internet or via a different network. Example embodiments are therefore also signal sequences representing data which are suitable for transmission via a network or via a data communication connection, wherein the data represent the program.

A program according to at least one example embodiment can carry out one of the methods during its execution, for example, by reading from storage locations or by writing a datum or a plurality of data to the storage locations, as a result of which switching processes or other processes in transistor structures, in amplifier structures or in other electrical, optical, magnetic components or components operating according to a different functional principle are, if necessary, invoked. Data, values, sensor values or other information can be acquired, determined or measured accordingly by a program by reading from a storage location. A program can therefore acquire, determine or measure variables, values, measurement variables and other information by reading from one or more storage locations, and can effect, instigate or perform an action and control other devices, machines and components by writing to one or more storage locations.

The example embodiments described above merely represent an illustration of the principles of the present disclosure. Modifications and variations of the arrangements and details described herein will obviously be evident to other experts. It is therefore intended that the disclosure is limited only by the scope of protection of the patent claims below, and not by the specific details that have been presented by way of the description and the explanation of the example embodiments herein.

REFERENCE NUMBER LIST

10 Device
12 Transceiver module
14 Control module
100 Mobile device
110 Determine whether time period lies below a time threshold value
120 Use a first mobile communication system
130 Use a second mobile communication system
210 Computing unit
220 WLAN transceiver
230 Mobile telecommunication transceiver
240 Backend
250 Vehicle bus
260 Storage unit
270 Sensor for fuel reserve

The invention claimed is:

1. An apparatus for a mobile device, the apparatus comprising:
    a transceiver module for communication in a first mobile communication system and in a second mobile communication system; and
    a control module to:
        determine whether a time period until an estimated next time for replenishing an energy reserve of the mobile device lies above a time threshold value, and
        use the first mobile communication system for a data transmission in response to determining that the time period lies above the time threshold value, and use the second mobile communication system for the data transmission in response to determining that a connection to the second mobile communication system is available at or before the next time for replenishing the energy reserve of the mobile device.

2. The apparatus of claim 1, wherein the control module determines whether a probability that the mobile device will be located in a coverage area of the second mobile communication system at the estimated next time for replenishing the energy reserve is less than a probability threshold value, and wherein the control module uses the first mobile communication system for the data transmission in response to the probability being less than the probability threshold value.

3. The apparatus of claim 1, wherein the control module determines a position of the mobile device, wherein the control module determines, based on the position of the mobile device, whether the time period until an estimated next time for replenishing the energy reserve of the mobile device lies above the time threshold value, and/or
    wherein the control module determines, based on a further time period since a last time for replenishing the energy reserve of the mobile device, whether the time period until an estimated next time for replenishing the energy reserve of the mobile device lies above the time threshold value, and/or
    wherein the control module determines, based on an energy consumption of the mobile device, whether the time period until an estimated next time for replenishing the energy reserve of the mobile device lies above the time threshold value.

4. The apparatus of claim 1, wherein the replenishment of the energy reserve of the mobile device corresponds to a replenishment of the energy reserve with electrical energy, with a liquid fuel, with gasoline, with diesel, with natural gas, with liquefied petroleum gas or with hydrogen.

5. The apparatus of claim 1, wherein the mobile device corresponds to a vehicle, or wherein the mobile device corresponds to a mobile telephone, a programmable mobile telephone, a programmable clock or a tablet computer.

6. The apparatus of claim 5, wherein the control module determines whether a further time period until an estimated next vehicle service on the vehicle lies above the time threshold value, and wherein the control module uses the first mobile communication system for the data transmission in response to the time period and the further time period lying above the time threshold value.

7. The apparatus of claim 1, wherein the first mobile communication system corresponds to a cellular mobile telecommunication system and wherein the second mobile communication system corresponds to a wireless local network, and/or
wherein the first mobile communication system corresponds to a mobile communication system with a first higher range, and wherein the second mobile communication system corresponds to a mobile communication system with a second lower range.

8. The apparatus of claim 1, wherein the data transmission corresponds to a transmission of data with a data volume of more than 50 megabytes, and/or
wherein the data transmission corresponds to a transmission of map data, of program updates of computer programs of the mobile device, of updates of an operating system of the mobile device, of swarm data and/or of media data.

9. A method for a mobile device, the method comprising:
determining whether a time period until an estimated next time for replenishing an energy reserve of the mobile device lies below a time threshold value;
using a first mobile communication system for the data transmission in response to determining that the time period lies above the time threshold value; and
using a second mobile communication system for the data transmission in response to a connection to the second mobile communication system being available at or before the next time for replenishing the energy reserve of the mobile device.

10. A program with a program code to carry out a method when the program code is executed on a computer, a processor or a programmable hardware component, wherein the method comprises:
determining whether a time period until an estimated next time for replenishing an energy reserve of the mobile device lies below a time threshold value;
using a first mobile communication system for the data transmission in response to determining that the time period lies above the time threshold value; and
using a second mobile communication system for the data transmission in response to a connection to the second mobile communication system being available at or before the next time for replenishing the energy reserve of the mobile device.

* * * * *